United States Patent
Bolta et al.

(10) Patent No.: US 6,917,154 B2
(45) Date of Patent: Jul. 12, 2005

(54) SCOTOPIC AFTER-GLOW LAMP

(76) Inventors: Charles Bolta, 625 Matthews St., Ft. Collins, CO (US) 80524; Donald P. Northrop, 10561 Harebell Run, Littleton, CO (US) 80125

( * ) Notice: Subject to any disclaimer, the term of this patent is extended or adjusted under 35 U.S.C. 154(b) by 21 days.

(21) Appl. No.: 10/374,114

(22) Filed: Feb. 25, 2003

(65) Prior Publication Data

US 2003/0160560 A1 Aug. 28, 2003

Related U.S. Application Data

(60) Provisional application No. 60/359,896, filed on Feb. 27, 2002.

(51) Int. Cl.$^7$ .................................................. H01J 1/62
(52) U.S. Cl. ........................................ 313/487; 313/486
(58) Field of Search ................................ 313/485, 487, 313/635, 486

(56) References Cited

U.S. PATENT DOCUMENTS 4,644,223 A * 2/1987 de Hair et al. ............. 313/487

5,859,496 A 1/1999 Murazaki et al.

FOREIGN PATENT DOCUMENTS

EP 0 856 871 A 8/1998

* cited by examiner

*Primary Examiner*—Vip Patel
*Assistant Examiner*—Glenn Zimmerman
(74) *Attorney, Agent, or Firm*—Emery L. Tracy

(57) ABSTRACT

A scotopic after-glow lamp for maximizing an eye's ability to see under low light conditions is provided. The scotopic after-glow lamp comprises a non-uniform scotopic phosphor blend of scotopic enhanced phosphors and after-glow phosphors. A method for constructing a scotopic after-glow lamp for use in an electric lamp is also provided. The method comprises combining scotopic enhanced phosphors with after-glow phosphors and layering the combined phosphors on the lamp wall with at least a portion of the after-glow phosphors being against the lamp wall and at least a portion of the scotopic phosphors being exposed to the electric arc of the lamp. Protective layers, such as aluminum oxide powder, can be added in conjunction with the coating process to reduce the flaking and/or separation of the phosphors from the glass wall of the lamp and each other and enhance and lengthen the useful light production of the lamp as it ages.

25 Claims, 1 Drawing Sheet

1. Alon C
2. After-glow phosphor
3. Alon C
4. Scotopic phosphor
5. Alon C

1. Alon C
2. After-glow phosphor
3. Alon C
4. Scotopic phosphor
5. Alon C

SCOTOPIC AFTER-GLOW LAMP

The present application is a continuation and claims priority of pending provisional patent application Ser. No. 60/359,896, filed on Feb. 27, 2002, entitled "Scotopic After-Glow Bulb (Fluorescent Bulb With a Non-Uniform Phosphor Blend of Scotopic Enhances Phosphors and After-Glow Phosphors)".

BACKGROUND OF THE INVENTION

Although receptive field sizes account for some of the differences in visual sensitivity across the retina, the sensitivity at a given retinal location can also vary. The human eye can process information over an enormous range of luminance (about twelve (12) log units). The visual system changes its sensitivity to light; a process called adaptation, so that the eye can detect the faintest signal on a dark night and yet not be overloaded by the high brightness of a summer beach scene. Adaptation involves four major processes:

1. Changes in Pupil Size. The iris constricts and dilates in response to increased and decreased levels of retinal illumination. Iris constriction has a shorter latency and is faster (about 0.3 s) than dilation (about 1.5 s). There are wide variations in pupil sizes among individuals and for a particular individual at different times. Thus, for a given luminous stimulus, some uncertainty is associated with an individual's pupil size unless it is measured. In general, however, the range in pupil diameter for young people may be considered to be from two (2) mm for high levels to eight (8) mm for low levels of retinal illumination. This change in pupil size in response to retinal illumination can only account for a 1.2 log unit change in sensitivity to light. Older people tend to have smaller pupils under comparable conditions.

2. Neural Adaptation. Neural adaptation is a fast (less than one (1 s) second) change in sensitivity produced by synaptic interactions in the visual system. Neural processes account for virtually all the transitory changes in sensitivity of the eye where cone photopigment bleaching has not yet taken place (discussed below)—in other words, at luminance values commonly encountered in electrically lighted environments, below about 600 cd/m$^2$. Because neural adaptation is so fast and is operative at moderate light levels, the sensitivity of the visual system is typically well adjusted to the interior scene. Only under special circumstances in interiors, such as glancing out a window or directly at a bright light source before looking back at a task, will the capabilities of rapid neural adaptation be exceeded. Under these conditions, and in situations associated with exteriors, neural adaptation will not be completely able to handle the changes in luminance necessary for efficient visual function.

3. Photochemical Adaptation. The retinal receptors (rods and cones) contain pigments which, upon absorbing light energy, change composition and release ions which provide, after processing, an electrical signal to the brain. As previously stated, there are believed to be four photopigments in the human eye, one in the rods and one each in the three cone types. When light is absorbed, the pigment breaks down into an unstable aldehyde of vitamin A and a protein (opsin) and gives off energy that generates signals that are relayed to the brain and interpreted as light. In the dark, the pigment is regenerated and is again available to receive light. The sensitivity of the eye to light is largely a function of the percentage of unbleached pigment. Under conditions of steady brightness, the concentration of photopigment is in equilibrium; when the brightness is changed, pigment is either bleached or regenerated to reestablish equilibrium. Because the time required to accomplish the photochemical reactions is finite, changes in the sensitivity lag behind the stimulus changes. The cone system adapts much more rapidly than does the rod system; even after exposure to high levels of brightness, the cones will regain nearly complete sensitivity in ten (10 min) minutes—twelve (12 min) minutes, while the rods will require sixty (60 min) minutes (or longer) to fully dark-adapt.

4. Transient Adaptation. Transient adaptation is a phenomenon associated with reduced visibility after viewing a higher or lower luminance than that of the task. If recovery from transient adaptation is fast (less than one (1 s) second), neural processes are causing the change. If recovery is slow (longer than one (1 s) second), some changes in the photopigments have taken place. Transient adaptation is usually insignificant in interiors, but can be a problem in brightly lighted exteriors where photopigment bleaching has taken place. The reduced visibility after entering a dark movie theater from the outside on a sunny day is an illustration of this latter effect.

Scotopic and photopic vision is well known. As light levels decrease, the human eye responds more to bluer light and less to yellow/red light. With age, the eye also loses transmission of blue light and therefore benefits from more blue-light energy. The intent of this scotopic phosphor blend is to address both of these conditions with a phosphor that enhances human vision.

Accordingly, there is a need for a scotopic after-glow lamp (fluorescent lamp with a non-uniform phosphor blend of scotopic enhanced phosphors and after-glow phosphors) as part of an emergency lighting system. A combination of phosphor blends has been developed to be used in the scotopic after-glow lamp. The present invention is critical to an emergency lighting system to include the use of light bulbs made with a scotopically rich primary phosphor coat combined with a strontium aluminate after-glow base phosphor. The eye's ability to respond to the after-glow available light could be critical to a person's ability to react in an emergency situation. The primary scotopic phosphor blend of the present invention prepares the eye to respond and adapt quickly to the after-glow light if the lamp power is turned off and/or even if the lamp breaks.

SUMMARY

The present invention is a scotopic after-glow lamp for maximizing an eye's ability to see under low light conditions. The scotopic lamp comprises a non-uniform scotopic phosphor blend of scotopic enhanced phosphors and after-glow phosphors.

The present invention further includes a method for constructing a scotopic lamp for use in an electric lamp fixture with the scotopic after-glow lamp having a lamp wall. The method comprises combining scotopic enhanced phosphors with after-glow phosphors and layering the combined phosphors on the lamp wall with at least a portion of the after-glow phosphors being against the lamp wall and at least a portion of the scotopic phosphors being exposed to the electric arc of the lamp. Furthermore, a first layer of Alon C aluminum oxide powder is put on the glass wall, a second layer of Alon C is put in between the after-glow and scotopic phosphors, and a third layer of Alon C is put over the scotopic phosphor.

DETAILED DESCRIPTION OF THE INVENTION

Figure 1:
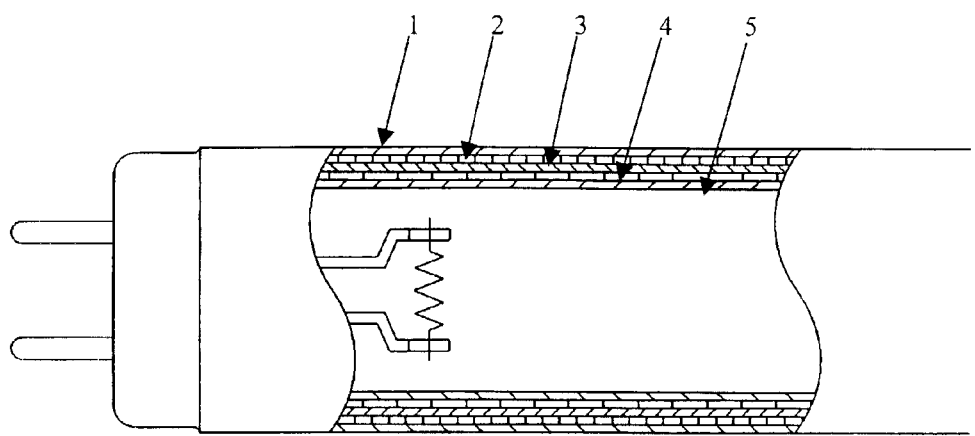
FIG. 1 is sectional view illustrating a scotopic after-glow lamp, constructed in accordance with the present invention.

The present invention is a scotopic after-glow lamp having a preferred phosphor blend composed of combined phosphors to give light primarily in the approximately 400- to approximately 620-nm range, with the resulting emitted light spectrum favoring the human eye scotopic-response curve, peaking at about 500 nm.

In addition, the phosphor combination of the scotopic after-glow lamp of the present invention is balanced to produce a good Color Rendering Index (CRI) for photopic vision. Preferably, the CRI number is approximately eighty-five (85) or greater to allow for very good color differentiation; however, a blend containing lower CRI will still provide excellent visualization for tasks such as reading, which require no color sensitivity.

Example Formulas for Scotopic Phosphor Blend:

EXAMPLE 1

| Preferred Approx. % | Phosphor Chemical Composition | Phosphor Peak (nm) |
|---|---|---|
| 55 | $(Sr\ Mg)_3\ (PO4): Sn$ | 622 |
| 35 | $Mg\ WO_4: W$ | 484 |
| 10 | $Ca\ WO_4: Pb$ | 438 |

EXAMPLE 2

| Preferred Approx. % | Phosphor Chemical Composition | Phosphor Peak (nm) |
|---|---|---|
| 40 | $SrO\ (P_2\ O_5\ B_2\ O_3): Eu$ | 478 |
| 22 | $Y_2\ O_3: Eu$ | 611 |
| 20 | $La\ PO_4: Co, Tb$ | 544 |
| 10 | $Sr_2\ P_2\ O_7: Eu$ | 421 |
| 8 | $Ba\ Mg_2\ Al_{16}\ O_{27}: Eu$ | 450 |

Shutdown/After-Glow State

The after-glow phosphor of the scotopic after-glow lamp of the present invention is selected with a hyperbolic decay rate dropping to approximately ten (10%) percent of its initial brightness in about six minutes and to one-tenth that in an hour. The after-glow phosphor takes more than a day to have non-visible radiation. The useful range of time for the lamp's glow is from approximately ten (10) minutes to several hours, depending on the number of lamps and the task.

In addition, the preferred after-glow phosphor is selected to have a peak emission output close to the scotopic (low light) response curve of the human eye—about 500 nm. An example of this phosphor is a strontium aluminate, rare-earth-activated phosphor $Sr_4AL_{14}O_{25}: Eu\ Dy$ with a peak emission spectrum at approximately 490 nm. With the lamp power on, the after-glow phosphor also contributes to the light from the scotopic blend and is charged up. When the lamp power is turned off the after-glow phosphors continue to glow. Fully charging the phosphor is accomplished in approximately fifteen (15) minutes to about an hour depending on lamp power.

Lamp Construction

In combination, the aforementioned phosphors will produce a similar scotopic spectrum and after-glow in any florescent lamp. However, the method of combination and application in the lamp is important to the enhancement of the operation of both phosphors within the lamp since Applicant has noticed the problem of phosphor flaking from the glass wall of conventional lamps and separation of phosphor layers because of the larger particle size of the after-glow phosphor.

As illustrated in FIG. 1, the preferred method is to form a composite phosphor lamp-wall coating by layering, with all or most of the after-glow phosphor against the lamp wall and the predominance or all of the scotopic phosphor exposed to the electric arc of the lamp. Protective layers, such as aluminum oxide powder, can be added in conjunction with the coating process to reduce the flaking and/or separation of the phosphors from the glass wall of the lamp and each other and enhance and lengthen the useful light production of the lamp as it ages.

The aluminum oxide powder Alon C is the preferred adhesive element because of the way it conforms to the size and structure of the after-glow phosphor particles. The Alon C can also be placed on the inner glass surface to reduce ion migration from the glass and to promote phosphor adherence. The Alon C powder can be placed on the scotopic phosphor surface exposed to the arc and/or placed between the phosphor layers to reduce mercury infiltration and increase adherence. In addition, each phosphor coating mix should preferably contain Alon C in the amount of 0.5% to 5.0% by weight. This amount can be adjusted higher or lower, depending on the particle distribution of each phosphor.

In another embodiment of the present invention, a spray-on after-glow phosphor is applied in a light coating to the exterior wall of a lamp after the lamp is manufactured. This spray-on after-glow phosphor can be applied to standard fluorescent and incandescent lamps. This spray-on after-glow phosphor will continue to glow when the lamp power is shut off. When the lamp is on and operating normally, the spray-on after-glow phosphor coating is slightly noticeable and causes only a slight decrease in normal lumen output. A number of different types of adhesive techniques can be used. It could be sprayed on using clear polyethylene, clear lacquer, any clear automotive topcoat, or any clear adhesive spray that would adhere to glass.

CONCLUSION

Combination of Phosphors

The combination of a corrected scotopic rich phosphor blend with a strontium aluminate after-glow phosphor blend of the present invention in a discharge fluorescent tube has been designed to maximize and compliment the eye's ability to see under low light conditions when the power goes out and the after-glow phosphors emit light. The combination of the scotopic rich phosphor blend and the after-glow phosphor blend compliment each other in many ways: visual acuity, scotopic eye response, color correctness, full spectrum, melatonin reduction, energy efficiency, and quicker emergency response in low light levels.

Visual Acuity

The preferred phosphor blend of the present invention is composed of combined phosphors to give light primarily in the approximately 400- to approximately 620-nm range, with the resulting emitted light spectrum favoring the human eye scotopic-response curve, peaking at about 500 nm. Scotopic and photopic vision has been well documented. As light levels decrease, the human eye responds more to bluer light (scotopic) and less to yellow/red light (photopic). As light levels decrease, the human eye also loses transmission of blue light. With age, the eye also loses transmission of blue light and therefore benefits from more blue-light energy.

The scotopic phosphor blend of the present invention addresses both of these conditions with a phosphor that enhances human vision. In addition, the phosphor combination of the present invention is balanced to produce a good Color Rendering Index (CRI) for photopic vision. Preferably, this number is approximately eighty (85) or greater to allow for very good color differentiation; however, a blend containing lower CRI will still provide excellent visualization for tasks such as reading, which require no color sensitivity.

Correction of Negative Perception of Scotopic Light

Scotopic blue lamps can produce certain problems: they visually distort skin tones and they may cause headaches and nausea. The phosphor blend of the present invention has added red and green phosphors in a ratio that will produce light with a chromaticity of between 5,000K and 10,000K, which is close to the black-body locus in color space. By definition, the light thus produced is "white" light, which falls predominantly in the range of natural sunlight plus skylight. In addition, the phosphor blend of the present invention can produce light that is scotopically and photopically balanced between approximately eighty (85) to approximately ninety-five (95) CRI, thus eliminating the problems associated with blue scotopic lamps.

Kelvin Temperature

The useful Kelvin temperature in the scotopic spectrum can range between approximately 5,000 K and approximately 10,000 K. The inventors of the present invention found the correlated 7500 K range with a 2.50 scotopic to photopic ratio to be nominally rich in scotopic eye response and a complimentary match for the after-glow phosphor blend. This can be adjusted depending on future research. Note: it is critical that the highest scotopic to photopic ratio be obtained for emergency response. However, the range between approximately 5,000 K and approximately 10,000 K will still provide reasonable scotopic eye response.

The Addition of a UV Component

The addition of a UV component to the phosphor blend of the present application creating a full spectrum natural light with UVA/B balance can be adjusted for different applications without changing the effectiveness of this scotopic blend.

Melatonin Stimulus

Melatonin regulates the circadian cycle of sleep. The scotopic phosphor blend of the present invention is particularly rich in the scotopic spectrum (approximately between 420–550 nm) of light. At approximately 420 nm, the melatonin reaction starts and, at approximately 550 nm, the melatonin reaction ends. The benefit of this wavelength of light (enhanced blue energy) is that it can reduce the output of melatonin in the human body. The range between approximately 420 nm and approximately 480 nm shows the highest level of melatonin blood ratio drop.

The phosphor blend of the present invention is rich in this area with peaks at 478 nm, 450 nm, and 421 nm. The scotopic after-glow lamps of the present invention are intended for installation in work environments such as in a submarine or an engine room of a boat or any low light environment where there is a lack of sunlight and where it is critical that the worker remain awake and alert. Therefore, the worker will have lower melatonin levels and a better chance to remain awake and alert, and also their eyes would be scotopically stimulated and ready to react to emergency low light situations. The scotopic phosphor blend of the present invention could also, theoretically, be used as light therapy for S.A.D. (Seasonal Affective Disorder) and be therapeutic in a low light environment such as a submarine along with its emergency light qualities.

After-Glow

The after-glow phosphor of the present invention is selected with a hyperbolic decay rate dropping to approximately 10% of its initial brightness in about six minutes and to one-tenth that in an hour. The phosphor takes more than a day (24 hours) to have non-visible radiation. The useful range of time for the lamp's glow is from approximately 10 minutes to approximately several hours, depending on the number of lamps and the task. In addition, the preferred after-glow phosphor is selected to have a peak emission output close to the scotopic (low light) response curve of the human eye—about 500 nm.

An example of this phosphor is a strontium aluminate, $Sr_4AL_{14}O_{25}$: Eu Dy rare-earth-activated phosphor with a peak emission spectrum at approximately 490 nm. With the lamp power on, the after-glow phosphor also contributes to the light from the scotopic blend and is charged up. When the lamp power is turned off the after-glow phosphors continue to glow. Fully charging the phosphor is accomplished in approximately fifteen (15) minutes to about an hour depending on lamp power. The lamp can be broken and still glow even after internal gasses are released, furthermore even broken pieces of the lamp on the floor will still glow and have some useful effect under emergency conditions.

Emergency Response

Human response time is critical in an emergency. The scotopic phosphor blend of the present invention produces light that enhances the eye's ability to adapt to varying lower light levels. Therefore, photochemical adaptation and transient adaptation response times are quicker.

Because the time required accomplishing photochemical reactions is finite, changes in the sensitivity lag behind the stimulus changes. The cones of the eye adapt much more rapidly than do the rods; even after exposure to high levels of brightness, the cones will regain nearly complete sensitivity in approximately ten (10 min) minutes to twelve (12 min) minutes, while the rods will require approximately sixty (60 min) minutes (or longer) to fully dark-adapt. The scotopic blend of the present invention, in fact, places the eye in a state of emergency readiness because the eye is already operating under higher scotopic light levels therefore engaging the stimulation of the rod receptors in the eye.

The amount of scotopic enhancement of the blend of the present invention that can be adjusted determines the amount of increased or decreased dilation of the pupil and engagement of the eye's rods. The amount of dilation and rod receptor stimulation under this scotopic blend prepares the eye to respond to the lower light levels of the after-glow phosphor blend which is primarily scotopic light and has a low light response curve of approximately 490 nm when the lamp power is turned off. Therefore, the eye's photochemical adaptation and transient adaptation response times are quicker and human response time is critically reduced in an emergency.

Scotopic illuminant predicts pupil size and has been demonstrated in several studies. The after-glow light output will continue for a period of time after power is cut off, the lamp is broken, and gasses released; and even the pieces on the floor will continue to emit light, therefore maximizing this emergency lighting lamp to its greatest potential. The lamp, when charged, can be removed from the fixture. The lamp will continue to glow and can be used as a portable emergency light source for conducting activities in dark remote locations.

Energy Efficiency

A lamp containing the scotopic rich phosphor blend of the present invention needs approximately two-thirds (⅔) the power to achieve the same visual acuity as photopic lighting. Less lamps use less power, approximately one-third (⅓) less, that way a submarine or boat or military installation can use its electrical resources for offense or defense. This phosphor blend is critical as to application of use of energy in a critical situation such as a submarine or military installation where the amount of lamps and wattage can be reduced because of the scotopic phosphor blend of the present invention. Also, the power can be shut off to the lights and they still have emergency lighting leaving extra power for emergency use.

Scotopic light usage and reduction of energy is very useful in emergency situations. The eye has to work less to achieve the same visual acuity. In a submarine, an engine room of a boat, or a military building it is critical that power consumption be used for defense or offense rather than for lighting. Therefore, the use of this scotopic rich light of this invention is of great importance. This can be used in remote locations of any building under emergency situations where power has to be diverted to things other than lighting.

Night-Light

The scotopic after-glow blend of the present invention could be used effectively as a night-light. This phosphor blend can be incorporated into a compact fluorescent lamp and inserted into existing light fixtures in the common bedroom or bathroom or any area in a house. When the light is turned off, the after-glow would continue to illuminate for safe traveling throughout the house during nighttime low light levels. The phosphors can continue to glow for up to twenty-four (24) hours after power is cut to bulb thereby reducing energy consumption. Also, during power interruption to a house, this night-light would take on the application of emergency lighting.

Aquarium/Cages

One of the side effects of turning off a light in an aquarium or a cage is that it startles the fish, reptiles, birds or other animals in that environment and does not simulate a natural nighttime transition. This scotopic phosphor blend can be minimally adjusted with UVA/B component to be a useful light for the correct biological/progressive response to fish, reptiles, birds or other animals. Typically, when an aquarium light is switched off the fish will dart and change directions quickly which indicates that the animals are stressed. When this scotopic after-glow lamp is shut off, or a dimming timed shut off is planned into the electric lamp fixture, the after-glow light would simulate a more natural transition to a nighttime environment, therefore reducing the stress on the animals. Furthermore, the light makes a slower transition into near darkness and the after-glow scotopic light simulates the low light output of the moon.

Glare on Monitors

One of the side effects of fluorescent or general photopic lighting is glare on monitors such as computers or other instrumentation. The scotopic phosphor blend of the present invention reduces glare, increases visual acuity, and increases black and white contrast. This scotopic blend has a lower lumen output therefore reducing glare on the monitor screen while at the same time increasing the eye's ability to see better because the rods of the eye are stimulated. Approximately one-third to one-half less lumens as in regular photopic lighting are needed for the same visual acuity with this scotopic phosphor blend. In many offices people turn off the lights to reduce glare, but with the after-glow engaged there would be much less glare and people would still have enough light to safely navigate about the space.

Pilot Room on Boat or Airplane

One of the side effects of nighttime navigation is the problem of reading under light to see charts or instrumentation and then having to look out into darkness. This is another example of photochemical adaptation and transient adaptation response times. With the scotopic after-glow blend of the present invention, the pilot can read or perform tasks and look out into darkness with minimal effect on his or her visual adaptation, and could also turn the brighter scotopic light off and still have a background after-glow illumination for moving about the cabin. As an example, the standard procedure when using a periscope on a submarine is to turn off the bright interior lighting and turn on a photopic red light in order to darken the room. This scotopic after-glow phosphor blend would be applicable in this situation where the scotopic light would be the normal operating light and the after-glow light would function to lower the interior light level when using the periscope. Furthermore, the scotopic after-glow phosphor range would be better than the photopic red light and could possibly be used as a primary light source for when the periscope is being used rather than the photopic red that is being used now. The rods of the operator's eyes would be engaged for improved viewing out into the darkness of the night. This scotopic after-glow blend would also benefit pilots by regulating melatonin stimulus. Falling asleep is a well-documented problem for nighttime navigators. In the event of a catastrophic power failure the after-glow phosphors illumination would allow the pilot to continue to read charts or perform simple tasks.

Variance of Use

This scotopic after-glow phosphor blend of the present invention can be used in a wide variety of fluorescent tubes and lamp. These scotopic after-glow lamp can fit into existing fluorescent battery backup emergency lighting fixtures extending their time of emergency luminance. These could also be put into any location where unpredictable power disruption happens frequently such as in New York City subways.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A scotopic after-glow lamp for maximizing an eye's ability to see under low light conditions, the scotopic bulb comprising:

a non-uniform scotopic phosphor blend of scotopic enhanced phosphors and after-glow phosphors;

wherein the phosphor blend is composed of combined phosphors providing light in the approximately 400-nm to approximately 620-nm range, with the resulting emitted light spectrum favoring the human eye scotopic-response curve, peaking at about 500 nm.

2. The scotopic after-glow lamp of claim 1 wherein the scotopic phosphor blend includes the following blends:

| Preferred Approx. % | Phosphor Chemical Composition | Phosphor Peak (nm) |
|---|---|---|
| 55 | $(Sr\ Mg)_3\ (PO4)$: Sn | 622 |
| 35 | $Mg\ WO_4$: W | 484 |
| 10 | $Ca\ WO_4$: Pb | 438. |

3. The scotopic after-glow lamp of claim 1 wherein the scotopic phosphor blend includes the following blends:

| Preferred Approx. % | Phosphor Chemical Composition | Phosphor Peak (nm) |
|---|---|---|
| 40 | $SrO\ (P_2\ O_5\ B_2\ O_3)$: Eu | 478 |
| 22 | $Y_2\ O_3$: Eu | 611 |
| 20 | $La\ PO_4$: Co, Tb | 544 |
| 10 | $Sr_2\ P_2\ O_7$: Eu | 421 |
| 8 | $Ba\ Mg_2\ Al_{16}\ O_{27}$: Eu | 450. |

4. The scotopic after-glow lamp of claim 1 wherein the scotopic phosphor blend has a scotopic spectrum between approximately 420 nm and approximately 550 nm of light whereby at approximately 420 nm, the melatonin reaction starts and, at approximately 550 nm, the melatonin reaction ends.

5. The scotopic after-glow lamp of claim 4 wherein the scotopic spectrum of between approximately 420 nm and approximately 480 nm shows the highest level of melatonin blood ratio drop.

6. The scotopic after-glow lamp of claim 5 wherein the scotopic phosphor blend has scotopic spectrum peaks at 478 nm, 450 nm, and 421 nm.

7. The scotopic after-glow lamp of claim 4 wherein the scotopic light is normal operating light and the after-glow light functions to lower the interior light level when using a periscope or within a pilot room.

8. The scotopic after-glow lamp of claim 1 wherein the phosphors blend is balanced to produce a Color Rendering Index (CRI) for photopic/scotopic vision of approximately sixty (60) to eighty-five (85) CRI.

9. The scotopic after-glow lamp of claim 1 wherein the phosphor blend has an added red and green tone phosphors such that the phosphor blend produces light that scotopically and photopically balanced between eighty-five (85) to ninety-five (95) CRI.

10. The scotopic after-glow lamp of claim 1 wherein the after-glow phosphors are strontium aluminate after-glow phosphors blend.

11. The scotopic after-glow lamp of claim 10 the strontium aluminate after-glow phosphor blend has a peak emission output of approximately 490 nm.

12. The scotopic after-glow lamp of claim 1 wherein the preferred Kelvin temperature in the scotopic spectrum ranges between approximately 5,000 K and approximately 10,000 K.

13. The scotopic after-glow lamp of claim 12 wherein the Kelvin temperature is approximately 7500 K range with a 2.50 scotopic to photopic ratio.

14. The scotopic after-glow lamp of claim 1 and further comprising:
a UV component for creating a full spectrum natural light with UVA/B balance adjustable for different applications without changing the effectiveness of this scotopic blend.

15. The scotopic after-glow lamp of claim 14 wherein the scotopic phosphor blend is adjusted with the UVA/B component such that when the scotopic after-glow lamp is shut off, or a dimming timed shut off is planned into the electric lamp fixture, the after-glow light simulates a natural transition to a nighttime environment, therefore reducing the stress on animals for the correct biological/progressive response to fish, reptiles, birds or other animals in aquariums and the like.

16. The scotopic after-glow lamp of claim 1 wherein scotopic phosphor blend invention reduces glare, increases visual acuity, and increases black and white contrast on a computer monitor.

17. The scotopic after-glow lamp of claim 1 wherein the after-glow phosphor has a hyperbolic decay rate dropping to approximately 10% of its initial brightness in approximately six minutes.

18. The scotopic after-glow lamp of claim 1 wherein the scotopic phosphor blend of scotopic enhanced phosphors and after-glow phosphors are applied to an exterior wall of the lamp.

19. A scotopic after-glow lamp for maximizing an eye's ability to see under low light conditions, the scotopic bulb comprising:
a non-uniform scotopic phosphor blend of scotopic enhanced phosphors and after-glow phosphors;
wherein the scotopic phosphor blend includes the following blends:

| Preferred Approx. % | Phosphor Chemical Composition | Phosphor Peak (nm) |
|---|---|---|
| 55 | $(Sr\ Mg)_3\ (PO4)$: Sn | 622 |
| 35 | $Mg\ WO_4$: W | 484 |
| 10 | $Ca\ WO_4$: Pb | 438. |

20. A scotopic after-glow lamp for maximizing an eye's ability to see under low light conditions, the scotopic bulb comprising:
a non-uniform scotopic phosphor blend of scotopic enhanced phosphors and after-glow phosphors;
wherein the scotopic phosphor blend includes the following blends:

| Preferred Approx. % | Phosphor Chemical Composition | Phosphor Peak (nm) |
|---|---|---|
| 40 | $SrO\ (P_2\ O_5\ B_2\ O_3)$: Eu | 478 |
| 22 | $Y_2\ O_3$: Eu | 611 |
| 20 | $La\ PO_4$: Co, Tb | 544 |
| 10 | $Sr_2\ P_2\ O_7$: Eu | 421 |
| 8 | $Ba\ Mg_2\ Al_{16}\ O_{27}$: Eu | 450. |

21. A scotopic after-glow lamp for maximizing an eye's ability to see under low light conditions, the scotopic bulb comprising:
a non-uniform scotopic phosphor blend of scotopic enhanced phosphors and after-glow phosphors;
wherein the Kelvin temperature is approximately 7500° K with a 2.50 scotopic to photopic ratio.

22. A scotopic after-glow lamp for maximizing an eye's ability to see under low light conditions, the scotopic bulb comprising:

a non-uniform scotopic phosphor blend of scotopic enhanced phosphors and after-glow phosphors; and a UV component for creating a full spectrum natural light with UVA/B balance adjustable for different applications without changing the effectiveness of this scotopic blend.

23. A scotopic after-glow lamp for maximizing an eye's ability to see under low light conditions, the scotopic bulb comprising:

a non-uniform scotopic phosphor blend of scotopic enhanced phosphors and after-glow phosphors;

wherein the scotopic phosphor blend of scotopic enhanced phosphors and after-glow phosphors are applied to an exterior wall of the lamp.

24. A scotopic after-glow lamp for maximizing an eye's ability to see under low light conditions, the scotopic bulb comprising:

a non-uniform scotopic phosphor blend of scotopic enhanced phosphors and after-glow phosphors;

wherein the peak scotopic range of Kelvin temperature is between approximately 5,000 °K and approximately 10,000°K for physical and photochemical adaptation of the eye from a light environment to a dark environment.

25. The scotopic after-glow lamp of claim 22 wherein the scotopic phosphor blend is adjusted with the UVAIB component such that when the scotopic after-glow lamp is shut off, or a dimming timed shut off is planned into the electric lamp fixture, the after-glow light simulates a natural transition to a nighttime environment, therefore reducing the stress on animals for the correct biological/progressive response to fish, reptiles, birds or other animals in aquariums and the like.

* * * * *